United States Patent [19]

Kuehn

[11] 4,093,601

[45] June 6, 1978

[54] VINYL ESTERS OF TETRACARBOXYLIC ACIDS AND RESINS DERIVED THEREFROM

[75] Inventor: Erich Kuehn, Wilmington, Del.

[73] Assignee: ICI Americas Inc., Wilmington, Del.

[21] Appl. No.: 727,411

[22] Filed: Sep. 29, 1976

[51] Int. Cl.² ............... C08F 218/14; C08F 224/00; C08F 226/06

[52] U.S. Cl. ............... 260/63 UY; 260/42.43; 260/859 R; 260/873; 526/72; 526/258; 526/265; 526/266; 526/270; 526/284; 526/309; 526/328

[58] Field of Search ............ 260/63 UY; 526/72, 258, 526/265, 266, 270, 284, 309, 328

[56] References Cited

U.S. PATENT DOCUMENTS

| | | | |
|---|---|---|---|
| 3,004,957 | 10/1961 | Lynn | 526/265 |
| 3,301,918 | 1/1967 | Dereich | 526/258 |
| 3,544,529 | 12/1970 | Hedrick et al. | 526/265 |
| 3,553,180 | 1/1971 | Cleary | 526/265 |

Primary Examiner—Harry Wong, Jr.

[57] ABSTRACT

Vinyl esters of tetracarboxylic acids having the following general formula:

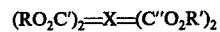

wherein $=X=$ is selected from tetravalent 5 or 6 membered or double 6 membered ring systems and wherein C' and C'' carbons are attached to separate pairs of vicinal carbons and one of each R and R' is selected from terminally ethylenically unsaturated aliphatic or aryl aliphatic radicals and the other of each R and R' is selected from —H and —CH$_2$CH(OH)CH$_2$O$_2$CCR''=CH$_2$,—CH[CH$_2$(OH)]CH$_2$O$_2$CCR''=CH$_2$ wherein R'' is —H or —CH$_3$, are useful in the preparations of high molecular weight polymers and copolymers which are improved in temperature stability and strength at high temperatures.

8 Claims, No Drawings

VINYL ESTERS OF TETRACARBOXYLIC ACIDS AND RESINS DERIVED THEREFROM

The invention relates to vinyl esters of tetracarboxylic acids and highly branched, vinyl resins made therefrom having exceptional strength at high temperatures. In particular, the vinyl esters are sequential reaction products of a dianhydride with monohydroxy vinyl compounds and epoxy acrylic esters.

The vinyl esters are selected from a group consisting of those having the general formula:

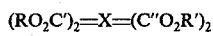

wherein =X= is selected from a tetravalent 5 or 6 membered single ringed system and a double 6 membered ring system wherein the C' carbons are attached to a pair of vicinal carbons in said ring system and the C" carbons are attached to another pair of vicinal carbons in said ring system, wherein one each of R and R' is a terminally ethylenically unsaturated aliphatic or arylaliphatic radical and the other of each R and R' is selected from —H, and —CH$_2$CH(OH)CH$_2$O$_2$CCR"=CH$_2$,—CH[CH$_2$(OH)]CH$_2$O$_2$CCR"=CH$_2$ wherein R" is H or —CH$_3$.

Vinyl esters of anhydrides and dianhydrides have been known and employed in the manufacture of resins as, for example, those described in U.S. Pat. Nos. 3,046,258; 3,225,065; 3,336,360; 3,391,223; 3,451,980; 3,535,404; 3,652,598; 3,760,033; 3,785,849; 3,905,942 and 3,919,172.

The above-described vinyl esters may be homopolymerized or copolymerized with additional ethylenically unsaturated monomers or resins to form high molecular weight materials which are improved in temperature stability and strength.

The above vinyl monomers are prepared by reacting a dianhydride of a tetracarboxylic acid with a monohydroxy vinyl compound in mol ratios of dianhydride to vinyl compound of about .5 to form a divinyl di-half-ester which optionally may thereafter be reacted with glycidyl acrylate or methacrylate in a second stage in molar ratios of di-half-ester to glycidyl compound of from about 0.5/1 to 1/1 to form the hydroxyl-containing triester or tetraester.

The tetrafunctional dianhydride may be selected from compounds wherein the =X= in the above general formula is selected from a tetravalent 5 or 6 membered carbocyclic or heterocyclic single-ringed system or a double 6 membered ring system. Usually the tetracarboxylic acids occur as two pairs of carboxyl groups on separate pairs of adjacent carbon atoms. Each pair of carboxyl groups may occur on the same, adjacent rings or separate rings. The ring systems may be selected from carbocyclic or heterocyclic systems which contain elements such as nitrogen and oxygen, for example, pyrrole and furan, pyridine, etc.

Representative of 5 membered ring systems are derivatives of cyclopentane, tetrahydrofuran, pyrrole, cyclopentene, cyclopentadiene and furan. Representative of 6 membered ring systems are benzene, pyridine, pyran, cyclohexane, naphthalene, benzophenone, dioxane, dibenzene, anthracene, and dibenzyl methane. Representative dianhydrides are: tetrahydrofuran tetracarboxylic dianhydride; cyclopentane tetracarboxylic dianhydride; pyromellitic dianhydride; benzophenone tetracarboxylic dianhydride; naphthalene tetracarboxylic dianhydride; pyrrolene tetracarboxylic dianhydride; anthracene tetracarboxylic dianhydride, biphenyl tetracarboxylic dianhydride; diphenylmethane tetracarboxylic dianhydride. Also included are halogenated and alkylated derivatives of the tetracarboxylic dianhydrides such as 2,2-bis(3,4-dicarboxyphenyl)hexafluoropropane dianhydride.

The monohydroxy vinyl compounds useful in preparing ester groups which are terminally ethylenically unsaturated aliphatic or aryl aliphatic radicals may be selected from compounds such as allyl alcohol, glycerol diallyl ether, trimethylolpropane diallyl ether, monoacrylic or monomethacrylic esters of dihydroxy compounds, and alkoxylated derivatives of these monohydroxy esters.

Preferred monohydroxy vinyl compounds which may be employed in the first stage reactions include any hydroxyalkyl acrylate of the formula HOR'-O$_2$CCR"=CH$_2$ where R' is a divalent alkyl radical having 1-3 carbon atoms and R" is —H or —CH$_3$. Specific examples of such compounds include hydroxymethyl, hydroxyethyl and hydroxyisopropylacrylate, hydroxymethyl, hydroxyethyl and hydroxyisopropyl methacrylate.

The glycidyl compound is selected from glycidyl acrylate and glycidyl methacrylate, and depending upon the ring opening sequence the vinyl ester group formed upon condensation with the free carboxyl group remaining after an anhydride opening will have the structure —CH$_2$CH(OH)CH$_2$O$_2$CCR"C=CH$_2$ or —CH(CH$_2$OH)CH$_2$O$_2$CCR"=CH$_2$ wherein R" is —H or —CH$_3$.

As stated previously, the process for preparing the vinyl ester monomers of this invention is a two-stage process. The first stage is conducted by mixing the dianhydride and the hydroxyalkyl acrylate compound into a reaction vessel to open the anhydride rings to form a di-half-diester.

The temperature at which the ring opening can be conducted can be varied widely. The reaction will go at room temperature but preferably the reaction mixture is heated usually to between 70° and 120° C. although temperatures as high as 150° C. or higher may be employed depending upon the stability of the reactants or the acceptability of lower yield due to side reactions. The proportion of the reactants is not critical, however, to obtain maximum conversion to the diester a mole ratio of ½ of the dianhydride to the hydroxy vinyl compound is desirable. Slight molar excesses or deficiencies of the hydroxy compound do not substantially affect the resins made therefrom.

The reaction may be carried out in bulk or, if desired, in the presence of an inert aromatic or polar solvent such as, for example, dimethylformamide, a polyethylene glycol dimethyl ether, ketones, toluenes, xylene, and in many instances the vinyl monomer such as styrene, methyl methacrylate, etc.

The first stage of the reaction is usually conducted in the absence of a catalyst, however, if desired a catalyst for anhydride ring opening may be employed, such as the organic amine complexes of iron, copper or nickel.

The optional second stage reaction may be conducted by adding 1 or 2 mols of the glycidyl compound to the product of the first stage reaction. The temperature at which the second stage reaction is conducted is subject to wide variation. It can be carried out at various temperatures ranging from room temperature to about 150° C. Since the reaction is usually exothermic, it is necessary to control the addition rate such that the temperature does not exceed about 150° C. as a means for minimizing side reactions.

While the use of a catalyst is not essential in the second stage reaction, it may be desirable to employ an amine catalyst such as N-methylmorpholine.

Since the process has at least 1 reactant in each step containing polymerizable unsaturation it is desirable, although not absolutely necessary, to employ an inhibitor in the reaction mixture, for example a quinone, a hydroquinone, or a phenolic inhibitor of the type conventionally employed with unsaturated acrylic type monomers. Further examples of inhibitors include quinone, hydroquinone, methylquinone, methylhydroquinone and the dimethyl ether of hydroquinone.

The di-, tri- and tetra- esters of the dianhydrides described above, because they contain on the average of 2 active hydrogens either 2 hydroxyl, 1 hydroxyl and 1 carboxyl hydrogen, or 2 carboxyl are useful in the formation of polyester resins. They are also useful as intermediates in the formation of vinyl copolymers because of their 2, 3 or 4 vinyl groups.

It is, therefore, the object of the present invention to provide new monomers for use in forming polyester condensation type resins as well as addition copolymer resins. Furthermore, the invention includes polymerizable combination of these monomers as well as sheets, adhesives and laminates made therefrom.

Suitable comonomers are ethylenically unsaturated monomers especially styrene, divinyl benzene and vinyl toluene which act as solvents for the vinyl esters which are capable of undergoing addition reactions with the ethylenically unsaturated double bonds in the presence of a suitable initiator catalyst and which form relatively high molecular weight highly cross-linked branched resins in a short period of time.

These reactions between the vinyl esters and other vinyl monomers or ethylenically unsaturated resins can be carried out at substantially ambient temperature when initiated by means of ultraviolet light, by means of chemical initiators/activator systems or by means of high energy electrons. The curing is usually effected in the presence of a free radical initiator type catalyst such as an organic peroxygen compound, for example, benzoyl peroxide, tertiary butyl hydroperoxide, ditertiary butyl peroxide, dicumyl peroxide, tertiary butyl peracetate, tertiary butyl perbenzoate, ditertiary butyl perphthalate, tertiary butyl peroxyisopropyl carbonate or bisisobutyronitrile. The activators or catalysts can be employed in amounts of from 0.01 to about 5% by weight of the monomers. Photosensitive catalysts may include, for example, inorganic uranyl salts such as uranyl nitrate, uranyl chloride, uranyl salts of organic acids, photosensitive dyes such as rose bengal, and aromatic disulfides such as diphenyl disulfide. Other photosensitizers include alpha diketones, such as biacetyl, benzyl, benzophenone, benzoin and the like. Such systems require the presence of a reducing agent capable of reducing the photosensitizer the most common of which are amines, such as propyl amine, dipropyl amine, and the like.

The vinyl comonomers from which a vinyl copolymer is derived may be, for example, a vinyl ester, an aryl vinyl compound, a vinyl nitrile, or divinyl compounds. If desired, the vinyl copolymer may be derived from a plurality of vinyl monomers. Suitable vinyl esters include, for example, vinyl acetate, and esters of acrylic acid and methacrylic acid wherein the ester moiety is an alkyl, aryl, alkaryl, aralkyl or cycloalkyl group. Vinyl esters of acrylic and methacrylic acids may also be employed.

Aromatic vinyl compounds such as styrene or an alpha alkyl derivative thereof, for example alphamethyl styrene or vinyl naphthalene, are readily available commercially.

Suitable vinyl nitriles include, for example, acrylonitrile and derivatives thereof, for example methacrylonitrile.

The vinyl esters of the dianhydride of the invention may also be directly copolymerized with ethylenically unsaturated polyesters which are formed by the reaction of ethylenically unsaturated polycarboxylic acids and polyols.

Ethylenically unsaturated polyester resins are well known in the art and are usually prepared by reacting carboxylic acids or their anhydrides with polyhydric alcohols. They are prepared using a procedure wherein at least one of the reactive components contains alpha,-beta-ethylenic unsaturation. These resins while primarily linear can contain branch chains by the addition of polyols or polycarboxylic acids having more than two functional groups. Usually they contain a plurality of ethylenically unsaturated linkages distributed along the backbones of their polymer chains. The use of alpha,-beta-ethylenically unsaturated polycarboxylic acids combines a convenient method of introducing ethylenic unsaturation into the polyester resin. It is preferred to employ alpha,beta-ethylenically unsaturated dicarboxylic acids such as maleic, fumaric, citraconic, gammic, gamma-dimethyl citraconic, mezaconic, itaconic, alpha methyl itaconic, gamma-methyl itaconic, teraconic, and the like, as well as mixtures thereof, but minor amounts of alpha,beta-ethylenically unsaturated polycarboxylic acids containing three or more carboxylic groups such as aconitic acid and the like together with the dicarboxylic acids are also useful.

Whenever available, the anhydrides of any of the aforementioned alpha,beta-ethylenically unsaturated polycarboxylic acids may be substituted for the acid. In addition, suitable saturated acids or their anhydrides, when available, which may also be incorporated along with the unsaturated polyesters include, for example, phthalic acid or anhydride, isophthalic acid, terephthalic acid, tetrabromophthalic acid, tetrachlorophthalic acid, adipic acid, sebacic acid, glutaric acid, or mixtures thereof. Of particular interest may be mentioned a mixture of isophthalic or orthophthalic acid and fumaric/maleic acids.

Any of a large number of ethylenically unsaturated or saturated polyhydric alcohols may be employed with any of the above suitable mixtures. Dihydric alcohols and especially saturated aliphatic diols are preferred as coreactants in the preparation of polyester resins. Among the dihydric alcohols which may be employed are saturated aliphatic diols such as ethylene glycol, propylene glycol, butylene glycol, diethylene glycol, dipropylene glycol, triethylene glycol, tetraethylene glycol, butane diol, pentane diol, hexane diol, neopentyl glycol, and the like as well as mixtures thereof. Among the polyols having more than two hydroxyl groups which may be employed in minor amounts to form branch chains are saturated aliphatic polyols such as glycerol, trimethylolethane, trimethylolpropane, pentaerythritol, arabitol, xylitol, dulcitol, sorbitol, mannitol and the like as well as mixtures thereof. In addition, aliphatic aromatic diols and polyols may be employed as well as halogenated and alkoxylated derivatives thereof such as alkoxylated bisphenol A.

Other ethylenically unsaturated materials may be added along with the polyester resins such as vinyl ester urethane resins as disclosed in U.S. Pat. Nos. 3,876,726; 3,297,745; 3,371,056; 3,509,234; 3,641,199; 3,642,943; and 3,677,920, to name a few.

The ethylenically unsaturated polyester may also include typical ethylenically unsaturated polyepoxy condensation products which are condensation polyethers produced as, for example, those formed from epichlorohydrin and diols such as bisphenol A, and their ethylenically unsaturated condensation products. Epoxidized polybutadienes are also useful.

The ethylenically unsaturated polymer material may also contain polyisocyanurates such as poly(1,3,5-tri-R substituted S-triazine-2,4,6 trione) wherein the R group may contain ethylenic unsaturation or groups reactive with ethylenically unsaturated materials. R groups may also be linked with epoxy, polyurethane and polyester resins. Such isocyanurates are represented by U.S. Pat. Nos. 2,952,655; 3,041,313; 3,821,098; 3,850,770; 3,719,638; 3,437,500; 3,947,736; and 3,762,269.

The following examples illustrate ways in which the invention has been carried out but are not to be construed as limiting its scope.

EXAMPLE 1

449.8 grams of 96% hydroxyethyl methacrylate and 0.65 grams of a hydroquinone is charged to a flask equipped with stirrer and thermometer. The mixture is then heated to 90° C. after which 162.7 grams of pyromellitic dianhydride is added. The mixture is then heated slowly to a temperature of 130° C. and becomes clear after the reaction is complete. At this point, another 100 grams of pyromellitic dianhydride are added. Then after 30 min. at 130° C. a remaining 100 grams of pyromellitic dianhydride are added. After 1 hr. at 134°–147° C. 487.5 grams of glycidyl methacrylate is added dropwise over a 1 hr. period. The reaction of glydicyl methacrylate is exothermic and the temperature is kept at between 134° and 143° C. during the addition period. The reaction mix is held for an additional 1½ hr. period at 130° until a clear product is obtained. A vacuum is applied to strip any volatile side products introduced by the various reactants.

The product formed is a highly viscous resin having an acid number in the range of 25.

1,295 grams of the hot resin is then poured into a ½ gallon jar and diluted to 75% solids with 432 grams of styrene. The solution has a viscosity of 830 centipoises at room temperature.

50 grams of the 75% solids in styrene solution is then mixed in a 4 oz. jar with 0.4 gram of 6% cobalt naphthanate, 0.8 grams methyl ethyl ketone peroxide (60% in dimethylphthalate) [Lupersol DDM ®] and 0.1 gram of a 10% solution of tertiary butyl catechol in styrene. The resin gels in 40 min. and has a peak exotherm temperature of 221° C.

A standard 2-ply laminate is then prepared between sheets of polyester film employing 780 grams of the 75% solids in styrene solution as prepared above by dissolving 1,295 grams of the hot resin in 432 grams of styrene, 6.24 grams of cobalt naphthanate, 12.4 grams methyl ethyl ketone peroxide, 60% in dimethyl phthalate, 1.56 grams of 10% tertiary butyl catechol, 2 chopped fiber glass mats, and 2 sheets of C-fiber glass surfacing veil using a total of 236 gram of fiber glass.

The resin wets out the fiber glass very well and after a room temperature cure of 24 hrs. and a post-cure of 4 hrs. at 100° C., an excellent clear, amber colored laminate is obtained. The properties of this laminate are shown at elevated temperatures in Table I.

EXAMPLE 2

Similar to the procedure and equipment outlined in Example 1, pyromellitic dianhydride is reacted in sequence with 2 molar portions of hydroxypropyl methacrylate and 2 molar portions of glycidyl methacrylate as follows: 566.72 grams of hydroxy propyl methacrylate and 0.74 grams of hydroquinone are charged and heated to 90° C. 100 grams of pyromellitic dianhydride are added at 115° C. and the mixture further heated to 135° C. After 10 min., another 100 gram portion of pyromellitic dianhydride is added and thereafter permitted to stand for 1 hr. at 135° to 140° C. after which the remaining 186.26 grams are added. After mixing for 1 hr. at 135°–140° C. 519.4 grams of glycidyl methacrylate is added dropwise over a 45 min. period such that the exotherm temperature of the solution does not exceed 140° C. The remaining mix is vacuum-stripped at 130° C. leaving 1,380 grams of a clear resin which is thereafter dissolved in 571 grams of styrene to form a 70% solids resin mix. The styrene solution has a viscosity of 372 centipoise at room temperature.

50% of the 70% solids solution is blended with 0.8 grams of peroxide catalyst, 0.4 grams cobalt naphthanate, and 0.15 grams of a 10% solution of tertiary butyl catechol in styrene. The resin gels in 30 minutes and has a peak exotherm temperature of 277° C.

A 2-ply laminate is prepared from 891 grams of the 70% resin/styrene solution as prepared by dissolving 1,380 grams of clear resin in 571 grams of styrene as prepared above mixed with 14.24 grams of methyl ethyl ketone peroxide, 60% by weight in dimethyl phthalate, 7.12 grams cobalt naphthanate, and 0.89 grams of a 10% solution of tertiary butyl catechol in styrene. 253 grams of chopped fiber glass mat and 17 grams of C-fiber glass surfacing veil are laid-up between 2 sheets of polyester film. The resin wets the fiber glass well and after a room temperature cure of 24 hrs. and a post-cure of 4 hrs. at 100° C. the laminate is tested at elevated temperatures, the results of which are shown in Table I.

EXAMPLE 3

A monomer is formed by reacting a 1 molar portion of 3,3',4,4' benzophenone tetracarboxylic dianhydride with a 2 molar portion of hydroxyethyl methacrylate followed by a 2 molar portion of glycidyl methacrylate as follows: Similar to the procedure outlined for Example 1, 292.6 grams of hydroxyethyl methacrylate and 0.47 grams of hydroquinone are mixed at 90° C. The mixture is heated to 130° and a 100 gram portion of benzophenone tetracarboxylic dianhydride is added. At 125° the mixture begins to clear and another 100 gram portion of benzophenone tetracarboxylic dianhydride is added. After another 30 min. an additional 147 grams of benzophenone tetracarboxylic dianhydride are added. The mixture becomes clear at 130° C. in 30 minutes. 306 grams of glycidyl methacrylate is added over 1½ hrs. at a rate such that the exotherm temperature does not exceed 130° C. After 2 hrs. at 130° the mixture is vacuum-stripped for a 1¼ hr. period to remove volatiles. The remaining 819 grams of clear, amber resin is then mixed with 473 grams of styrene to form a 63.3 solids solution which has a viscosity of 722 centipoises at room temperature.

50 grams of this 63% solids solution is then mixed with 0.5 gram cobalt naphthanate, 0.5 gram Lupersol DDM ® and 0.1 gram of a 10% tertiary butyl catechol solution in styrene. The resin has a gel time of 20 min. and a peak exotherm temperature of 189° C.

A 2-ply laminate is prepared from 925 grams of the above 63.3% solids solution as prepared by dissolving 819 grams of resin in 473 grams of styrene, 9.25 grams cobalt naphthanate, 9.25 grams Lupersol DDM ® and 1.85 grams of a 10% tertiary butyl catechol solution in styrene using 2 sheets of chopped fiber glass mat weighing 262 grams, and 2 layers of a C-fiber glass surfacing veil weighing 18 grams. The resin wets the glass readily and is permitted to cure for 24 hrs. at room temperature and thereafter post-cured for 4 hrs. at 100° C. Physical properties of the laminate are shown at elevated temperatures in Table I.

EXAMPLE 4

800 grams of the tetravinyl ester of pyromellitic dianhydride made according to the procedure of Example 1 is diluted with 342 grams of methyl methacrylate in place of styrene to form a clear amber colored solution having 70% resin solids and a viscosity of 488 centipoise at room temperature.

A laminate is prepared from 890 grams of this 70% solids solution and catalyzed with 14.24 grams Lupersol DDM ® and 1.78 grams of a 10% tertiary butyl catechol solution in styrene. Two plys of chopped fiber glass mat having a weight of 252 grams and 2 sheets of C-fiber glass surfacing veil weighing 17 grams are placed in the mold. The resin wets the glass readily and is cured at room temperature for 24 hrs. and at 100° C. for 4 hrs. Physical properties of the laminate are described in Table I.

EXAMPLE 5

1 molar portion of tetrahydrofuran dianhydride is reacted in sequence with 2 molar portions of hydroxypropyl methacrylate and 2 molar portions of glycidyl methacrylate as follows: 319.2 grams of hydroxypropyl methacrylate, 0.8 gram hydroquinone and 216.32 grams of tetrahydrofuran dianhydride are mixed at room temperature in equipment similar to that described in Example 1. The mixture is then heated to 125° C. and held for 120 min. after which 298.96 grams of glydicyl methacrylate is added over a 1 hr. period such that the heat of exotherm does not exceed 130° C. A clear solution is formed after 1 hr. at 120° C. The mixture is vacuum-stripped for 1 hr. at 120° C. leaving 800 grams of clear resin which is thereafter diluted with 230 grams of styrene to form a 77.6% solid solution. This clear, amber colored solution has a viscosity of 525 centipoises at room temperature.

50 grams of this 77.6% solution is mixed with 0.4 grams cobalt naphthanate, 0.8 grams Lupersol DDM!, 0.1 gram dimethylaniline and 0.1 gram of a 10% tertiary butyl catechol in styrene solution. The resin has a gel time of 1 hr. and a peak exotherm of 181° C.

A 2-ply laminate is then prepared as described previously employing 725 grams of the resin solution prepared by dissolving 800 grams of clear resin in 230 grams of styrene, 204 grams of chopped fiber glass mat and 2 sheets of C-fiber glass veil weighing 15 grams. The physical properties of the cured laminate are shown in Table I.

EXAMPLE 6

The tetravinyl ester of pyromellitic dianhydride of Example 2 is copolymerized with an ethylenically unsaturated polyester resin and styrene as follows: 114 grams of a polyester resin having an average molecular weight of 2,000 and formed by condensing equal molar portions of 2.2 polyoxypropylene bisphenol A with a mixture of maleic and fumaric anhydrides is mixed with 162.9 grams of the tetravinyl ester of Example 2 (60% solids) and 180 grams styrene to form 50% resin solids in styrene solution. This solution is then mixed with 3.64 grams cobalt naphthanate, 5.46 grams Lupersol DDM ®, 0.91 grams dimethylaniline and 1.82 grams 10% tertiary butyl catechol solution. A 2-ply laminate is prepared from a catalyzed solution using 2 sheets of chopped fiber glass mat weighing 129 grams and 2 layers of surfacing C-fiber glass veil weighing 9 grams using proportions similar to the above Examples. Physical properties for this laminate are shown in Table I.

EXAMPLE 7

The tetravinyl ester diol prepared according to Example 1 is used in this Example as a diol in the formation of a polyurethane resin. One mol of the tetraester of Example 1 is reacted with 2 mols of toluene diisocyanate and 2 mols of hydroxyethyl methacrylate as follows: In equipment similar to that described in Example 1 is charged 282.52 grams of the tetraester of pyromellitic dianhydride as 70% solids in styrene, 71.4 grams hydroxyethyl methacrylate, 258.93 grams styrene, 0.35 grams hydroquinone and 87.15 grams toluene diisocyanate. This mixture is held at 80° C. until the —NCO analysis drops to 0.23%. The remaining unreacted —NCO groups are then quenched with 5.15 grams of hydroxyethyl methacrylate.

A strong, clear casting is prepared by polymerizing 350 grams of the above solution employing 5.6 grams Lupersol DDM ® and 2.8 grams 6% cobalt naphthanate. Physical properties of this resin are described in Table I.

EXAMPLE 8

A vinyl urethane resin employing 1 mol of the tetravinyl ester of pyromellitic dianhydride made according to Example 2, 2 mols of toluene diisocyanate and 2 mols of hydroxypropyl methacrylate are prepared as follows: 245 grams of the resin made in Example 2 as a 75% solids in styrene is mixed with 202.5 grams styrene, 0.3 grams hydroquinone, 74.29 grams of hydroxypropyl methacrylate, and 80.74 grams toluene diisocyanate. This solution is held at 70° C. until all of the —NCO groups have been reacted. The clear, amber solution resulting has a viscosity of 378 centipoises at room temperature.

A casting is prepared by polymerizing 300 grams of the solution by adding 2.4 grams 6% cobalt naphthanate and 4.8 grams Lupersol DDM ®. The resin has a peak exotherm temperature of 180° C. The physical properties of the casting are shown in Table I.

EXAMPLE 9

The tetravinyl ester of Example 1 is mixed with a commercially available material containing 72% divinyl benzene in place of styrene to produce a resin solution containing 65% solids in divinyl benzene. The light, amber color solution has a viscosity of 834 centipoises at room temperature.

50 grams of this solution is mixed with 0.4 grams 6% cobalt naphthanate, 0.1 gram tertiary butyl catechol solution in styrene and 0.8 grams Lupersol DDM ®. The solution has a gel time of about 1 hr. and a peak exotherm temperature of 182° C.

A 2-ply laminate is prepared from 440 grams of the resin solution as prepared above by dissolving 1,295 grams of hot resin as prepared in Example 1 with 432 grams of divinyl benzene, 352 grams 6% cobalt naphthanate, 0.88 grams 10% tertiary butyl catechol and 7.04 grams Lupersol DDM ® using 2 layers of chopped fiber glass mat weighing 123 grams and 2 layers of a C-fiber glass surfacing veil weighing 9 grams. After curing as described above, the laminate has properties as described in Table I.

EXAMPLE 10

A resin is made by reacting 1 molar portion of 3,3', 4,4' benzophenone tetracarboxylic acid dianhydride with 2 molar portions of hydroxyethyl methacrylate as follows: In previously described equipment is charged 655.48 grams hydroxyethyl methacrylate and 0.7 grams hydroquinone. This mixture is heated to 80° C. and thereafter 744.52 grams of benzophenone tetracarboxylic dianhydride is added such that the heat of exotherm does not exceed 130° C. The resin is then held at 130° for 2½ hrs. The resin is clear, pliable brittle material at room temperature. 1,265 grams of the hot resin are then mixed with 842 grams of styrene to form a clear, amber solution having a viscosity of 534 centipoises at room temperature.

50 grams of this styrene solution are then mixed with 2 grams of Luperco ATC ® paste (benzoyl peroxide, 50% in tricrecyl phosphate) and 0.3 gram dimethylaniline. The mixture has a gel time of 30 min. and a peak exotherm of 151° C.

A 2-ply laminate is prepared from 455 grams of the resin solution as prepared above by dissolving 1,265 grams of the hot resin in 842 grams of styrene, 18.2 grams ATC paste and 2.73 grams dimethylaniline using 2 sheets of chopped fiber glass mat weighing 128 grams and 2 sheets of C-fiber glass surfacing veil weighing 9 grams. The laminate is laid-up between 2 sheets of polyester film. The resin shows excellent glass wet-out and cures after 24 hrs. at room temperature and 4 hrs. at 100° C. After cooling the transparent laminate to room temperature the polyester film could only be removed with great difficulty and tearing. Physical properties are shown in Table I.

A casting is prepared by pouring a solution as prepared above by dissolving 1,265 grams of hot resin in 842 grams of styrene of 350 grams of the above styrene resin solution containing 14 grams ATC paste and 2.1 grams dimethylaniline into a glass mold pretreated with a mold release agent. After a room temperature cure of 24 hrs. and a post-cure of 4 hrs. at 100° C. the casting was found to be cracked due to the strong adhesion of the cured resin to the glass. The physical properties of the casting are shown in Table I.

EXAMPLE 11

The divinyl ester formed by reacting 1 molar portion of tetrahydrofuran 2,3,4,5 tetracarboxylic dianhydride with a 2 molar portion of hydroxyethyl methacrylate is employed in a resin according to the following procedure: Into a reactor as previously described is charged 783.16 grams of hydroxyethyl methacrylate, 0.7 grams hydroquinone and 616.8 grams of tetrahydrofuran tetracarboxylic dianhydride. This mixture is then heated to about 95° C. and thereafter to 125° C. until clear. After about 3 hrs. at 125° the resin is diluted with styrene to 63.5% solids.

A casting is prepared from 300 grams of the solution, 12 grams APC paste and 1.8 grams dimethylaniline. After a room temperature cure of 24 hrs. and a post-cure of 4 hrs. at 100° C., the casting sticks to a glass mold so that it cannot be removed. This composition is, therefore, contemplated for use in preparing glass laminates.

EXAMPLE 12

A polyester resin polymer is combined with the divinyl monomer/styrene solution of Example 10 to form a cured resin as follows: A laminate is formed by mixing 227.5 grams of the polyester resin described in Example 6, 227.5 grams of the styrene solution prepared in Example 10, 18.2 grams of the ATC paste and 1.82 grams dimethylaniline employing 2 sheets of chopped fiber glass mat weighing 127 grams and 2 sheets of the C-fiber glass surfacing veil weighing 10 grams. After a 24 hr. room temperature cure and a 4 hr. 100° C. post cure, a clear, strong laminate results.

TABLE I

PHYSICAL PROPERTIES OF RESIN CASTING & LAMINATES

| EXAMPLE NO. | 1 | | | 2 | | | 3 | | | 4 | | |
|---|---|---|---|---|---|---|---|---|---|---|---|---|
| TEST TEMP. ° F | RT | 300° | 350° | RT | 300° | 350° | RT | 300° | 350° | RT | 300° | 350° |
| Flex.Strength, PSI | 21,700 | 15,500 | 11,500 | 19,300 | 14,200 | 10,900 | 18,700 | 17,200 | 11,000 | 20,700 | 18,250 | 13,400 |
| Flex.Modulus, PSI × $10^6$ | .92 | .46 | .37 | .90 | .45 | .33 | .90 | .44 | .31 | — | — | — |
| Barcol Hardness No. | 52–55 | 22–29 | 13–24 | 52–58 | 18–32 | 8–23 | 51–61 | 22–34 | 8–23 | 54–60 | 28–42 | 19–26 |
| Tensile Strength PSI | 11,700 | 9,500 | 8,500 | 10,100 | 9,500 | 9,000 | 11,500 | 10,100 | 9,000 | 12,600 | 10,200 | 8,750 |
| Tensile Modulus PSI × $10^6$ | 1.21 | .65 | .53 | 1.27 | .64 | .53 | 1.16 | .64 | .55 | 1.24 | .64 | .56 |
| % Elongation | 1.16 | 1.84 | 1.84 | 1.45 | 1.76 | 2.03 | 1.53 | 2.03 | 2.03 | 1.53 | 1.84 | 1.78 |
| Heat Distortion Temp. ° C | — | — | — | — | — | — | — | — | — | — | — | — |
| Charpy Impact | — | — | — | — | — | — | — | — | — | — | — | — |
| Notched Izod Impact | 10.92 | — | — | 9.87 | — | — | 11.15 | — | — | 10.90 | — | — |
| % Glass | 27.48 | — | — | 25.17 | — | — | 26.44 | — | — | 27.52 | — | — |

| EXAMPLE NO. | 5 | 6 | 7 | 8 | 9 | | | 10 | | 12 |
|---|---|---|---|---|---|---|---|---|---|---|
| TEST TEMP. ° F | RT | RT | RT | RT | RT | 300 | 350° | Casting | RT Laminate | RT Laminate |
| Flex.Strength, PSI | 18,450 | 22,000 | 19,000 | 23,000 | 27,000 | 15,500 | 16,000 | 22,900 | 20,300 | 19,100 |

TABLE I-continued

| | | | | | | | | | | |
|---|---|---|---|---|---|---|---|---|---|---|
| Flex.Modulus, PSI × 10⁶ | .94 | .86 | .48 | .58 | 1.89 | .50 | .49 | .65 | 1.15 | .97 |
| Barcol Hardness No. | 48–52 | 45–51 | 41–44 | 43–46 | 50–55 | 32–40 | 22–28 | 43–49 | 52–56 | 42–47 |
| Tensile Strength PSI | 11,800 | 12,400 | 9,200 | 11,200 | 10,000 | 9,800 | 9,100 | 10,700 | 12,900 | 12,400 |
| Tensile Modulus PSI × 10⁶ | 1.24 | 1.15 | .51 | .49 | .93 | .71 | .70 | .95 | 1.25 | 1.10 |
| % Elongation | 2.11 | 1.31 | 2.2 | 2.89 | 1.89 | 1.74 | 1.69 | 1.63 | 1.26 | 1.40 |
| Heat Distortion Temp. °C | — | — | 103.5 | 102 | — | — | — | 89 | — | — |
| Charpy Impact | — | — | 3.16 | 3.49 | — | — | — | — | — | — |
| Notched Izod Impact | 9.20 | 11.81 | — | — | 12.96 | — | — | — | 9.83 | 8.85 |
| % Glass | 25.67 | 26.67 | — | — | 25.07 | — | — | 27.34 | — | 26.01 |

From the Examples and physical properties table it is seen that the resins of the invention show significantly high flex strength values at temperatures up to 350° F. At 350° F. the resins retain good hardness and tensile strength. It is, therefore, contemplated that the resins of the invention are useful in forming castings and reinforced laminates where high temperature strength is required such as in aircraft components. Furthermore, some of the resins bond exceedingly well to glass and polyester film. In this instance they can be employed as glass adhesives and laminating resins for glass components.

It is contemplated that the resins of the invention can be used in combination with plasticizers, antioxidants, stabilizers and the like. In addition to those uses already described they can be used in combination with various other fillers, reinforcing filaments and fibers, pigments and coloring agents such as glass fibers, graphite fibers, synthetic resin fibers, titanium dioxide, wood fillers, metallic fibers, mineral fibers and mineral fillers to make molded parts and articles such as required for high temperature strength.

What is claimed is:

1. A composition curable to a condensation or addition type copolymer resin comprising one or more ethylenically unsaturated monomers selected from the group consisting of vinyl esters, aryl vinyl compounds, vinyl nitriles and divinyl compounds and a carbocyclic or heterocyclic carboxylic ester monomer useful in imparting heat resistance to vinyl resin copolymers made therefrom having the general formula:

$$(RO_2C')_2=X=(C''O_2R')_2$$

wherein =X= is selected from a tetravalent 5 or 6 membered single ring system and a double 6 membered ring system selected from the group consisting of cyclopentane, cyclopentene, cyclopentadiene, tetrahydrofuran, pyrrole, benzene, pyridine, cyclohexane, dioxane, naphthalene, dibenzene, benzophenol, anthracene and dibenzylmethane wherein the C' carbons are attached to one pair of vicinal carbons in said ring system and the C" carbons are attached to one other pair of vicinal carbons in said ring system wherein 1 each of R and R' is a terminally ethylenically unsaturated aliphatic radical linked by the removal of the hydroxyl group from compounds selected from the group consisting of monohydric vinyl alcohol and alkoxylated derivatives thereof and the other of each R and R' is selected from the group consisting of —H, —CH₂CH(OH)CH₂O₂CCR"=CH₂, and —CH[CH₂(OH)]CH₂O₂CCR"=CH₂, wherein R" is —H or —CH₃.

2. A composition of claim 1 wherein said carbocyclic or heterocyclic carboxylic ester monomer is prepared by the reaction of 1 molar portion of dianhydride having the general formula $O(OC')_2=X=(C''O)_2O$ wherein =X= is selected from a tetravalent 5 or 6 membered single ring system and a double 6 membered ring system wherein the C' carbons are attached to a pair of vicinal carbons in said ring system and the C" carbons are attached to another pair of vicinal carbons in said ring with 2 molar portions of a monohydroxy terminally ethylenically unsaturated aliphatic compound selected from the group consisting of allyl alcohol, glycerol diallyl ether, trimethylolpropane diallyl ether, monohydroxy ethyl-butene-2,3-alcohol, monoacrylic or monoacrylic esters of dihydroxy compounds and alkoxylated derivatives thereof wherein said dianhydrides are derivatives of acids selected from the group consisting of tetrahydrofuran tetracarboxylic; cyclopentane tetracarboxylic; pyromellitic; benzophenone tetracarboxylic; naphthalene tetracarboxylic; pyrrolene tetracarboxylic; anthracene tetracarboxylic; biphenyl tetracarboxylic; and diphenyl methane tetracarboxylic acids.

3. A composition of claim 2 wherein said carbocyclic or heterocyclic carboxylic ester is further reacted with 1 or 2 mols of glycidyl acrylate or glycidyl methacrylate to form a composition having a general formula:

$$(RO_2C')_2=X=(C''O_2R')_2$$

wherein =X= is selected from a tetravalent 5 or 6 membered single ring system and a double 6 membered ring system selected from the group consisting of cyclopentane, cyclopentene, cyclopentadiene, tetrahydrofuran, pyrrole, benzene, pyridine, cyclohexane, dioxane, naphthalene, dibenzene, benzophenol, anthracene and dibenzylmethane wherein the C' carbons are attached to one pair of vicinal carbons in said ring system and the C" carbons are attached to the other pair of vicinal carbons in said ring system wherein 1 each of R and R' is a terminally ethylenically unsaturated aliphatic radical linked by the removal of the hydroxyl group from compounds selected from the group consisting of monohydric vinyl alcohol and alkoxylated derivatives thereof and the other of each R and R' is selected from the group consisting of —H, —CH₂CH(OH)CH₂O₂CCR'=CH₂, and —CH[CH₂(OH)]CH₂O₂CCR'=CH₂, wherein R" is —H or —CH₃.

4. A composition of claim 1 having chemical initiator/activator systems for initiating the reaction between vinyl esters and other vinyl monomers.

5. A composition of claim 4 wherein said chemical initiator/activator systems comprise organic peroxygen compounds.

6. A composition of claim 4 having photosensitive free radical initiator catalyst.

7. A copolymer resin formed by curing a composition of claim 1.

8. A composition of claim 1 wherein R and R' is a terminally ethylenically unsaturated aliphatic radical linked by the removal of the hydroxyl group from compounds selected from the group consisting of allyl alcohol, glycerol diallyl ether, trimethylolpropane diallyl ether, monohydroxy ethyl-2,3-alcohol, monoacrylic or monomethacrylic ester of dihydric compounds and alkoxylated derivatives thereof.

* * * * *